US010958650B2

(12) United States Patent
Zhou

(10) Patent No.: US 10,958,650 B2
(45) Date of Patent: Mar. 23, 2021

(54) DATA PROCESSING METHOD, SYSTEM, AND APPARATUS, STORAGE MEDIUM, AND DEVICE

(71) Applicant: TENCENT TECHNOLOGY (SHENZHEN) COMPANY LIMITED, Shenzhen (CN)

(72) Inventor: Hongfei Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/504,207

(22) Filed: Jul. 5, 2019

(65) Prior Publication Data

US 2019/0334899 A1    Oct. 31, 2019

Related U.S. Application Data

(63) Continuation of application No. PCT/CN2018/084949, filed on Apr. 27, 2018.

(30) Foreign Application Priority Data

May 3, 2017    (CN) .......................... 201710305566.9

(51) Int. Cl.
*H04L 29/06*    (2006.01)
*H04L 9/08*    (2006.01)

(52) U.S. Cl.
CPC ........ *H04L 63/0884* (2013.01); *H04L 9/0869* (2013.01); *H04L 63/0823* (2013.01); *H04L 63/20* (2013.01)

(58) Field of Classification Search
CPC . H04L 63/0884; H04L 63/0823; H04L 63/20; H04L 9/0869
See application file for complete search history.

(56) References Cited

U.S. PATENT DOCUMENTS 9,871,772 B1 *   1/2018   Weinstein ............. H04L 9/0819
2006/0218623 A1   9/2006   Hodges et al.
(Continued)

FOREIGN PATENT DOCUMENTS

CN    102752109 A    10/2012
CN    102841902 A    12/2012
(Continued)

OTHER PUBLICATIONS

The World Intellectual Property Organization (WIPO) International Search Report for PCT/CN2018/084949 dated Jul. 20, 2018 5 Pages (including translation).

(Continued)

*Primary Examiner* — Alexander Lagor
*Assistant Examiner* — William B Jones
(74) *Attorney, Agent, or Firm* — Anova Law Group, PLLC

(57) ABSTRACT

This application discloses a data processing method, system, and apparatus, a storage medium, and a device, and belongs to the field of database technologies. The method includes receiving, a trigger request; triggering, according to the trigger request, the first cloud encryptor to store a root key seed, an operating policy, a data key seed, and a data key identifier, and triggering the database proxy to store an encryption data dictionary, the operating policy indicating an operation policy of the first cloud encryptor. The method further includes receiving a data processing request from the client; sending first data that the data processing request requests to process and the data key identifier in the encryption data dictionary to the first cloud encryptor. The method further includes implementing the operating policy, processing the first data, and responding to the data processing request by using the second data.

15 Claims, 7 Drawing Sheets

(56) References Cited

U.S. PATENT DOCUMENTS

| | | |
|---|---|---|
| 2013/0010957 A1 | 1/2013 | Yu et al. |
| 2013/0191650 A1* | 7/2013 | Balakrishnan .......... H04L 9/008 |
| | | 713/190 |
| 2013/0246813 A1 | 9/2013 | Mori et al. |
| 2016/0285623 A1* | 9/2016 | Yoon ................... G06F 21/6236 |
| 2016/0344745 A1* | 11/2016 | Johnson ................. H04L 63/08 |

FOREIGN PATENT DOCUMENTS

| | | |
|---|---|---|
| CN | 103279715 A | 9/2013 |
| CN | 103392178 A | 11/2013 |
| CN | 104426973 A | 3/2015 |
| CN | 106022155 A | 10/2016 |

OTHER PUBLICATIONS

The European Patent Office (EPO) The Extended European Search Report for 18795137.1 dated Nov. 23, 2020 11 Pages.

Khan Abdul Nasir et al., "A Cloud-Manager-Based Re-Encryption Scheme for Mobile Users in Cloud Environment: a Hybrid Approach," Journal of Grid Computing, Springer Netherlands, Dordrecht, vol. 13, No. 4, Oct. 9, 2015 (Oct. 9, 2015), pp. 651-675. 25 pages.

Weiwei Jia et al., "SDSM: A Secure Data Service Mechanism in Mobile Cloud Computing," 2011 IEEE Conference on Computer Communications Workshops (INFOCOM WKSHPS), Apr. 10, 2011 (Apr. 10, 2011), pp. 1060-1065. 6 pages.

Piotr K Tysowski et al., "Re-Encryption-Based Key Management Towards Secure and Scalable Mobile Applications in Clouds," IACR, International Association for Cryptologic Reserch, vol. 200111209:210901, Dec. 9, 2011 (Dec. 9, 2011), pp. 1-10. 10 pages.

* cited by examiner

DATA PROCESSING METHOD, SYSTEM, AND APPARATUS, STORAGE MEDIUM, AND DEVICE

CROSS REFERENCES TO RELATED APPLICATIONS

This application claims priority to PCT Application No. PCT/CN2018/084949, filed on Apr. 27, 2018, which claims priority to Chinese Patent Application No. 201710305566.9, entitled "DATA PROCESSING METHOD, SYSTEM, AND APPARATUS" filed with the National intellectual Property Administration, PRC on May 3, 2017. The two applications are incorporated by reference in their entirety.

FIELD OF TECHNOLOGY

The embodiments of this application relate to the field of database technologies, and in particular, to a data processing method, system, and apparatus, a storage medium, and a device.

BACKGROUND OF THE DISCLOSURE

To meet the user demand for database security, database systems need to encrypt the data written into the database and decrypt the data retrieved from the database.

In related technology, a database system encrypts/decrypts data using a transparent data encryption mode. During system implementation, the user defines a column to be encrypted, the database system creates a data key for a table including the column, and then encrypts the data key using a master key created for the database, and stores the master key in a "wallet" of the database, and stores the encrypted data key into a data dictionary in the database. When the user needs to write data to the column, the database reads the master key from the "wallet", decrypts the data key in the data dictionary using the master key, encrypts the data using the data key, and writes the encrypted data into the column. When the user needs to retrieve data the column, the database reads the master key from the "wallet", decrypts the data key in the data dictionary using the master key, and decrypts, by using the data key, the encrypted data read from the column.

The data key and the master key are both generated by the database, and are both stored in the database. That is, the key system is coupled into the database. Consequently, the database is not secure.

SUMMARY

The embodiments of this application provide a data processing method, system, and apparatus, a storage medium, and a device, to resolve the problem that the security of a database is not high when a key system is coupled into the database. The technical solutions are as follows.

According to an aspect, a data processing method is provided, and is used in a data processing system including a first cloud encryptor, a cloud manager, a database proxy, and a database, the first cloud encryptor being a cloud encryptor allocated by the cloud manager to a client. The method includes receiving, by the cloud manager, a trigger request from the client; triggering, by the cloud manager according to the trigger request, the first cloud encryptor to store a root key seed, an operating policy, a data key seed, and a data key identifier, and triggering the database proxy to store an encryption data dictionary, the operating policy indicating an operation policy of the first cloud encryptor; and receiving, by the data proxy, a data processing request from the client. The method further includes sending, by the database proxy, first data that the data processing request requests to process and the data key identifier in the encryption data dictionary to the first cloud encryptor in response to determining that the first data matches the encryption data dictionary; implementing, by the first cloud encryptor, the operating policy, processing the first data by using the root key seed and the data key seed that correspond to the received data key identifier, and sending second data obtained after the processing to the database proxy; and responding, by the database proxy, to the data processing request by using the second data.

Another aspect of the present disclosure provides a data processing method, applied to a cloud manager of a data processing system, the data processing system further comprising a first cloud encryptor, a database proxy, and a database, the first cloud encryptor being a cloud encryptor allocated by the cloud manager to a client. The method includes receiving a trigger request sent by the client; triggering, according to the trigger request, the first cloud encryptor to store a root key seed, an operating policy, a data key seed, and a data key identifier, and triggering the database proxy to store an encryption data dictionary, the operating policy indicating an operation policy of the first cloud encryptor. The first cloud encryptor is further configured to receive first data and the data key identifier in the encryption data dictionary that are sent by the database proxy; implement the operating policy; process the first data by using the root key seed and the data key seed that correspond to the received data key identifier, and send second data obtained after the processing to the database proxy, the database proxy being configured to respond to the data processing request by using the second data, the first data being data that the data processing request requests to process, and the first data and the data key identifier being sent by the database proxy when the database proxy determines that the first data matches the encryption data dictionary.

Another aspect of the present disclosure provides a data processing system, the data processing system comprising a first cloud encryptor, a cloud manager, a database proxy, and a database, the first cloud encryptor being a cloud encryptor allocated by the cloud manager to a client. The cloud manager receives a trigger request from the client. The cloud manager triggers, according to the trigger request, the first cloud encryptor to store a root key seed, an operating policy, a data key seed, and a data key identifier, and trigger the database proxy to store an encryption data dictionary, the operating policy indicating an operation policy of the first cloud encryptor. The database proxy receives a data processing request from the client. The database proxy sends first data that the data processing request requests to process and the data key identifier in the encryption data dictionary to the first cloud encryptor when determining that the first data matches the encryption data dictionary. The first cloud encryptor implements the operating policy, processes the first data by using the root key seed and the data key seed that correspond to the received data key identifier, and send second data obtained after the processing to the database proxy. The database proxy responds to the data processing request by using the second data.

In embodiments of the present disclosure, when receiving the data processing request and determining that the first data that the data processing request requests to process matches the encryption data dictionary, the database proxy sends the first data and the data key identifier to the first cloud encryptor. The first cloud encryptor processes the first data by using the root key seed and the data key seed that correspond to the received data key identifier. Because the root key seed and the data key seed are stored in the first cloud encryptor, the first data is stored in the database. That is, the key system is separated from the database. As such, even if the first data in the database is compromised, if the root key seed and the data key seed in the first cloud encryptor are secure, the first data still cannot be identified, thereby improving the security of the database.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1:
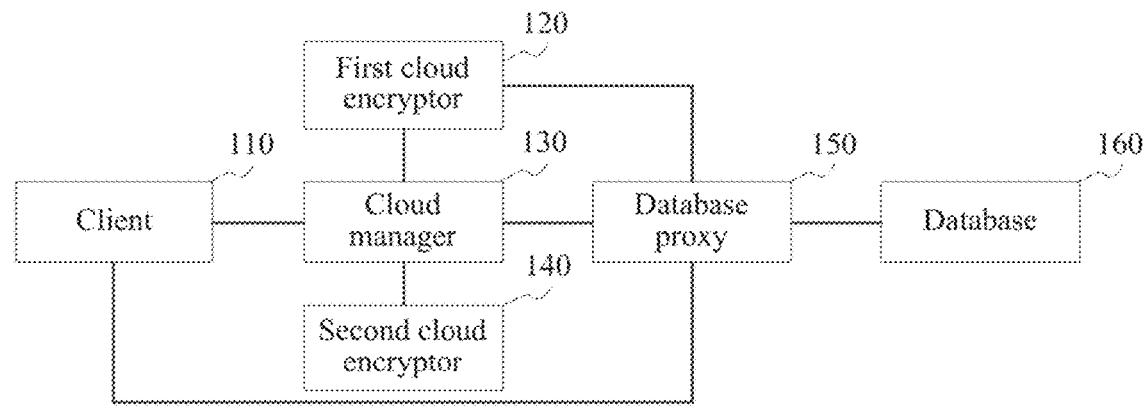
FIG. 1 is a schematic structural diagram of a data processing system according to some exemplary embodiments.

FIG. 1 is a schematic structural diagram of a data processing system according to an embodiment of this application. The data processing system includes a client 110, a first cloud encryptor 120, a cloud manager 130, a second cloud encryptor 140, a database proxy 150, and a database 160.

The cloud manager 130 keeps network connection to a plurality of cloud encryptors, to manage the cloud encryptors. In this embodiment, a cloud encryptor allocated by the cloud manager 130 to the client 110 is referred to as the first cloud encryptor 120. The first cloud encryptor 120 is configured to generate a data key seed. The data key seed is used to generate a data key. The first cloud encryptor 120 is a cloud encryptor selected, according to a principle of proximity by the cloud manager 130 from cloud encryptors that are not allocated to the client. In this embodiment, a cloud encryptor that keeps a dedicated network connection to the cloud manager 130 is referred to as the second cloud encryptor 140. The second cloud encryptor 140 is configured to generate a root key seed. The root key seed is used to generate a root key.

It should be noted that the cloud encryptor may be implemented by a cipher chip. One cipher chip may be implemented as one cloud encryptor. In this case, because one cloud encryptor is allocated to one user, the cipher chip may provide encryption and decryption services for one user. Because processing resources of one cipher chip exceed processing resources required by encryption and decryption services of one user, the cipher chip has some remaining processing resources. In this case, one cipher chip may be implemented as a plurality of cloud encryptors by using a virtualization technology. To be specific, one cipher chip corresponds to a plurality of cloud encryptors, and each cloud encryptor is allocated to one user, so that one cipher chip provides encryption and decryption services for a plurality of users.

In some embodiments, a same processing resource may be allocated to each cloud encryptor, or different processing resources may be allocated to different cloud encryptors according to user requirements. For example, the user demand is in a positive correlation with the number of processing resources. To be specific, a relatively large number of processing resources are allocated to a cloud encryptor with high user demand, and a relatively small number of processing resources are allocated to a cloud encryptor with low user demand.

A network connection is established between the client 110 and the cloud manager 130 via a wired or wireless network. In some embodiments, the network connection between the client 110 and the cloud manager 130 is a Hyper Text Transfer Protocol over Secure Socket Layer (HTTPS) connection, to improve the security of data transmission between the client 110 and the cloud manager 130.

A network connection is established between the client 110 and the database proxy 150 via a wired or wireless network. A network connection is established between the database proxy 150 and the database 160 via a wired or wireless network.

A certificate authority (CA) secure channel based on a CA certificate is established between the database proxy 150 and the first cloud encryptor 120, for data transmission between the database proxy 150 and the first cloud encryptor 120.

It should be noted that the CA certificate may have timeliness. When the CA certificate on which the CA secure channel is based expires, a CA secure channel based on a new CA certificate is re-established between the database proxy 150 and the first cloud encryptor 120, to ensure the security of the CA secure channel.

Figure 2:
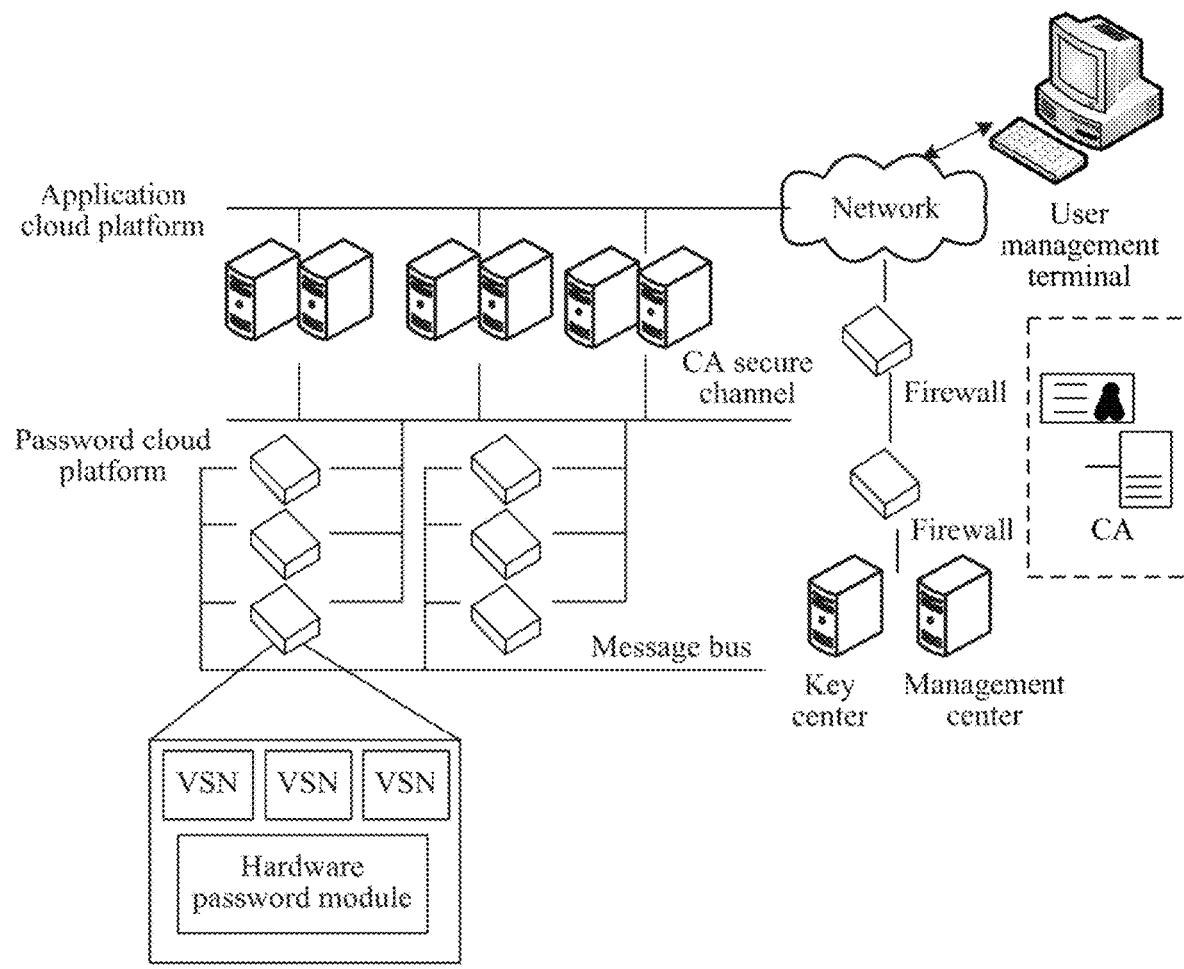
FIG. 2 is a schematic diagram of hardware of a data processing system according to some exemplary embodiments.

Referring to FIG. 2, a user management terminal in FIG. 2 is also the client 110 in FIG. 1, and the application platform is the database proxy 150 in FIG. 1. A password cloud platform includes the first cloud encryptor 120 and the second cloud encryptor 140 in FIG. 1. A password center is used to manage the password cloud platform. The management center is the cloud manager 130 in FIG. 1.

Figure 3:
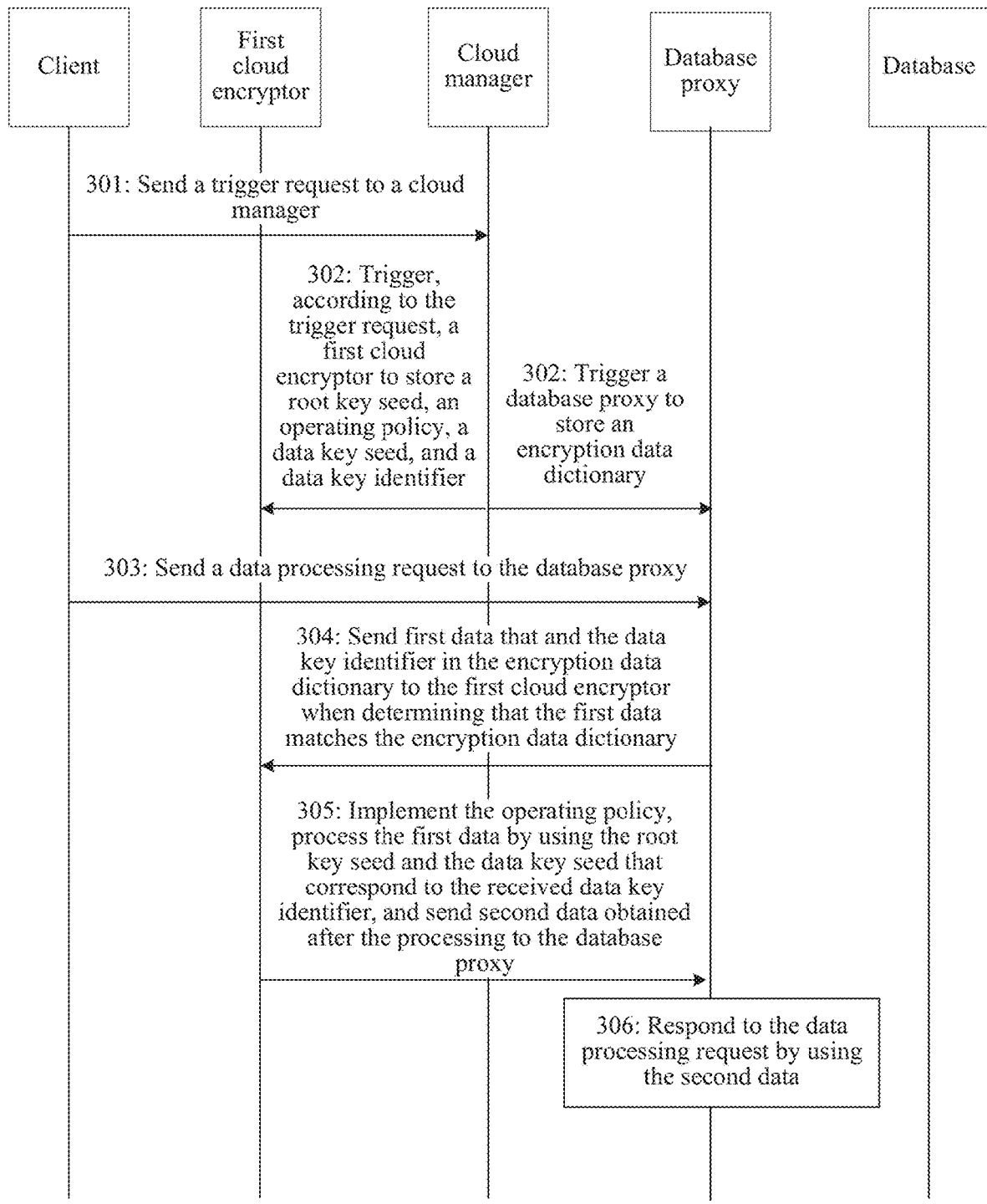
FIG. 3 is a method flowchart of a data processing method according to an embodiment of this application.

FIG. 3 is a method flowchart of a data processing method according to an embodiment of this application. The data processing method may be applied to the data processing system shown in FIG. 1. The data processing method includes the following steps:

Step 301: A client sends a trigger request to a cloud manager.

The trigger request is used to instruct the cloud manager to trigger a first cloud encryptor to store a root key seed, an operating policy, a data key seed, and a data key identifier, and trigger a database proxy to store an encryption data dictionary.

Step 302: The cloud manager triggers, according to the trigger request, a first cloud encryptor to store a root key seed, an operating policy, a data key seed, and a data key identifier, and triggers a database proxy to store an encryption data dictionary.

The operating policy is used to indicate an operation policy of the first cloud encryptor.

The data key seed is used to generate a data key. The data key is used to encrypt data to be written into a database, or the data key is used to decrypt data to be read from the database. The data key seed carries a flag bit used to indicate an encryption algorithm. Under control of the operation policy indicated by the operating policy, the first cloud encryptor generates a data key according to the encryption algorithm indicated by the flag bit and the data key seed. Different encryption algorithms generate different data keys.

The data key identifier is used to identify the data key seed. Under control of the operation policy indicated by the operating policy, the first cloud encryptor identifies the corresponding data key seed according to the data key identifier.

The root key seed is used to generate a root key. The root key seed carries a flag bit used to indicate encryption algorithm. Under control of the operation policy indicated by the operating policy, the first cloud encryptor generates a root key according to the encryption algorithm indicated by the flag bit and the root key seed. Different encryption algorithms generate different root keys.

The encryption data dictionary includes an encryption granularity. The encryption granularity is one of a database, a table, and a field. For example, when the encryption granularity is a database, the first cloud encryptor encrypts at least one database, or when the encryption granularity is a table, the first cloud encryptor encrypts at least one table in a database, or when the encryption granularity is a field, the first cloud encryptor encrypts at least one field in a table.

The user may need to encrypt different databases, or encrypt different tables in the database, or encrypt different fields in different tables, and in these cases, data keys corresponding to encryption granularities are different. Therefore, the encryption data dictionary further includes a data key identifier, so as to indicate data keys corresponding to different encryption granularities by using the data key identifier.

The client may select one of the database, the table, and the field as the encryption granularity according to requirements, thereby improving the flexibility of database encryption.

Step 303: The client sends a data processing request to the database proxy.

Step 304: The database proxy sends first data that the data processing request requests to process and the data key identifier in the encryption data dictionary to the first cloud encryptor when determining that the first data matches the encryption data dictionary.

When the data processing request is a read request, the database proxy reads, according to the data processing request, first data from the database, and that the first data matches the encryption data dictionary refers to that the first data read from the database is located in the encryption granularity of the encryption data dictionary. For example, the encryption granularity is a table b in a database a. If the first data read by the database proxy is located in the table b, it is determined that the first data matches the encryption data dictionary. If the first data read by the database proxy is not in the table b, it is determined that the first data does not match the encryption data dictionary.

After determining the encryption granularity, the database proxy further needs to determine the data key identifier corresponding to the encryption granularity, generate a decryption request carrying the first data and the data key identifier, and send the decryption request to the first cloud encryptor.

When the data processing request is a write request, that the first data matches the encryption data dictionary refers to that the first data to be written into the database is located in the encryption granularity of the encryption data dictionary. For example, the encryption granularity is the table b in the database a. If the database proxy needs to write the first data into the table b, it is determined that the first data matches the encryption data dictionary. If the database proxy does not need to write the first data into the table b, it is determined that the first data does not match the encryption data dictionary.

After determining the encryption granularity, the database proxy further needs to determine the data key identifier corresponding to the encryption granularity, generate an encryption request carrying the first data and the data key identifier, and send the encryption request to the first cloud encryptor.

Step 305: The first cloud encryptor runs the operating policy, processes the first data by using the root key seed and the data key seed that correspond to the received data key identifier, and sends second data obtained after the processing to the database proxy.

When the data processing request is a read request, under control of the operation policy indicated by the operating policy, the first cloud encryptor determines the root key seed by using the data key identifier, generates a root key according to the root key seed, encrypts the first data and the data key identifier according to the root key, and sends the encrypted first data and the encrypted data key identifier to an operation cache area. In the operation cache area, the first cloud encryptor determines the data key seed according to the data key identifier, generates the data key according to the data key seed, and decrypts the first data according to the data key, to obtain third data. The first cloud encryptor reads the third data from the operation cache area, then decrypts the third data according to the root key to obtain second data, and then sends the second data to the database proxy. The operation cache area is used to cache intermediate data in a process in which the first cloud encryptor processes the first data that the client requests to process.

When the data processing request is a write request, under control of the operation policy indicated by the operating policy, the first cloud encryptor determines the root key seed by using the data key identifier, generates a root key according to the root key seed, encrypts the first data and the data key identifier according to the root key, and sends the encrypted first data and the encrypted data key identifier to an operation cache area. In the operation cache area, the first cloud encryptor determines the data key seed according to the data key identifier, generates the data key according to the data key seed, and encrypts the first data according to the data key, to obtain fourth data. The first cloud encryptor reads the fourth data from the operation cache area, then decrypts the fourth data according to the root key to obtain second data, and then sends the second data to the database proxy.

In this process, the root key encrypts the first data sent into the operation cache area, and then decrypts the third data or fourth data output by the operation cache area, to obtain the second data, to ensure the security of data in the operation cache area.

Step 306: The database proxy responds to the data processing request by using the second data.

When the data processing request is a read request, the database proxy sends the second data to the client. When the data processing request is a write request, the database proxy sends the second data to the database for storage.

Steps 301 and 303 may be separately implemented as the embodiment on the client side, step 302 may be separately implemented as the embodiment on the cloud manager side, steps 304 and 306 may be separately implemented as the embodiment on the database proxy side, and step 305 may be separately implemented as the embodiment on the first cloud encryptor side.

Based on the above, according to the data processing method provided in this embodiment of this application, when receiving the data processing request and determining that the first data that the data processing request requests to process matches the encryption data dictionary, the database proxy sends the first data and the data key identifier to the first cloud encryptor; the first cloud encryptor processes the first data by using the root key seed and the data key seed that correspond to the received data key identifier; because the root key seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

Figure 4:
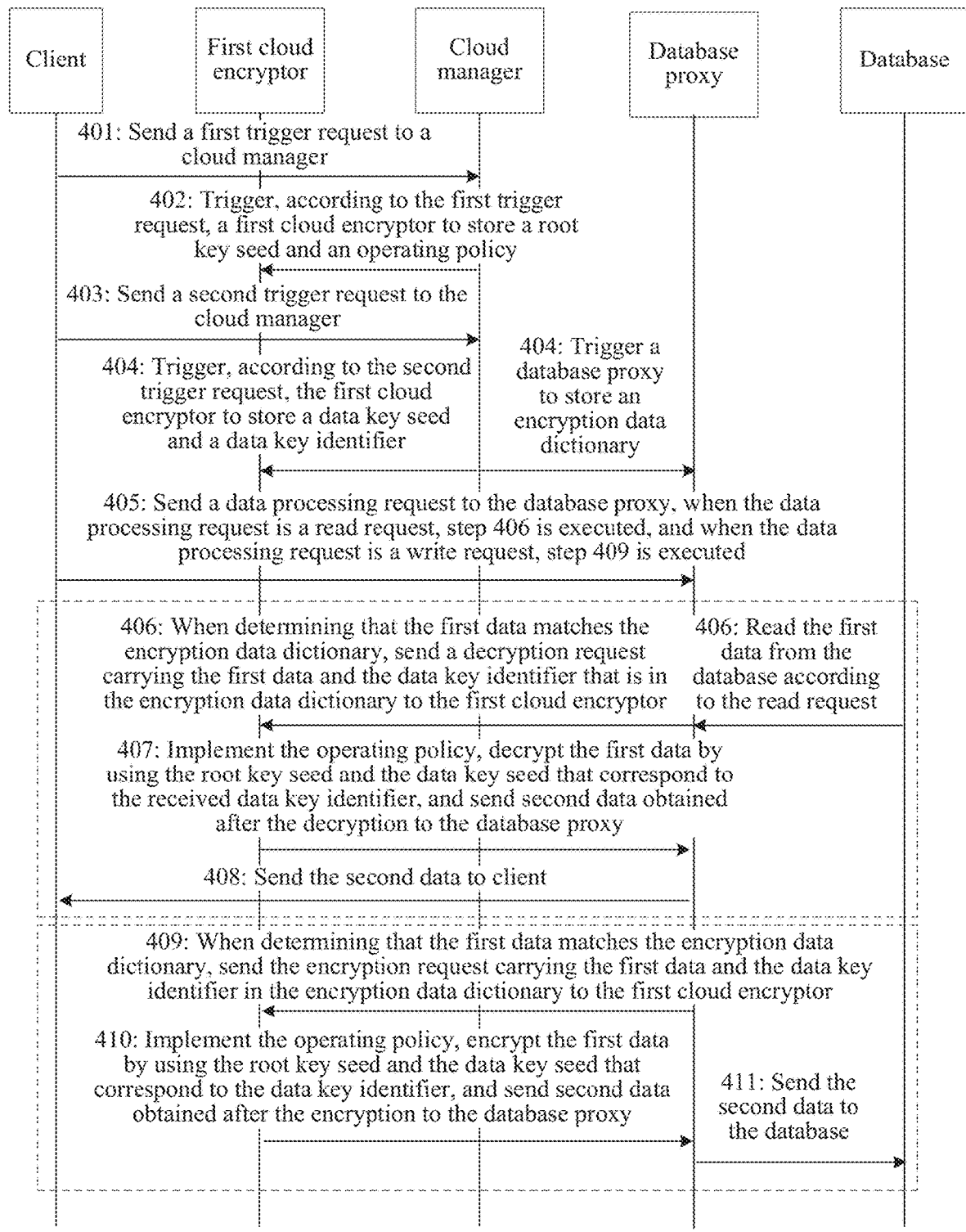
FIG. 4 is a method flowchart of a data processing method according to another embodiment of this application.

FIG. 4 is a method flowchart of a data processing method according to another detailed embodiment of this application. The data processing method may be applied to the data processing system shown in FIG. 1. In this embodiment, the data processing method is described by using an example in which the data processing request is a read request or a write request. The data processing method includes the following steps:

Step 401: A client sends a first trigger request to a cloud manager.

The first trigger request inquires the cloud manager to allocate a first cloud encryptor to the client. In one embodiment, the first trigger request may be a cloud encryptor purchase request. In this case, the cloud encryptor purchase request is used to request the cloud manager to allocate the first cloud encryptor to the client.

The cloud encryptor purchase request carries at least the identifier of the client. In some embodiments, the cloud encryptor purchase request may further carry attribute information of the client. The cloud manager may allocate the first cloud encryptor to the client according to the attribute information. For example, the attribute information may be used to indicate a geographical location of the client. The cloud manager allocates the first cloud encryptor to the client according to the attribute information and the principle of proximity.

Step 402: The cloud manager triggers, according to the first trigger request, a first cloud encryptor to store a root key seed and an operating policy.

For the definitions of the root key seed and the operating policy, see the descriptions in step 302 for details, which are not described again herein.

In this embodiment, under the indication of the first trigger request, the cloud manager instructs the client to select the first encryption algorithm, and sends the first encryption algorithm selected by the client to the second cloud encryptor. The second cloud encryptor generates the root key seed, and sends the root key seed to the cloud manager. The root key seed carries the flag bit used to indicate the first encryption algorithm. The cloud manager receives the root key seed sent by the second cloud encryptor. The cloud manager instructs the client to select the operating policy, and sends the root key seed and the operating policy that is selected by the client to the first cloud encryptor. The first cloud encryptor stores the root key seed and the operating policy.

When instructing the client to select the first encryption algorithm, the cloud manager performs login by using the identifier of the client carried in the first trigger request, and displays an encryption algorithm selection interface. The user selects one encryption algorithm from at least one encryption algorithm displayed by the encryption algorithm selection interface. In this embodiment, the encryption algorithm selected by the user is referred to as a first encryption algorithm.

After the cloud manager sends the first encryption algorithm to the second cloud encryptor, the second cloud encryptor generates the root key seed by using a cipher chip. The generation process is not described in detail herein.

Because different root keys may be generated according to different first encryption algorithms, a user may update the root key by updating the first encryption algorithm, to dynamically update the key system according to user requirements.

When instructing the client to select the operating policy, the cloud manager displays an operating policy selection interface. The user selects one operating policy from at least one operating policy displayed by the operating policy selection interface. When selecting the operating policy, the user further needs to select a single-user mode or a multiuser mode. When the user selects the single-user mode, it indicates that one cipher chip is implemented as one cloud encryptor. The operation cache area of the cipher chip is allocated to one user for use, and the operation cache area may be indicated by using an operating policy. When the user selects the multi-user mode, it indicates that one cipher chip is implemented as a plurality of cloud encryptors. In this case, the operation cache area of the cipher chip is divided into a plurality of intervals for allocation to different users for use, and one interval allocated to the user may be indicated by using the operating policy.

In this embodiment, the root key seed and the operating policy may be written into the first cloud encryptor by using the write circuit switched on in the first cloud encryptor. After the first cloud encryptor stores the root key seed and the operating policy, it is determined that the initiation process is completed, the write circuit of the first cloud encryptor is switched off, and a response to a purchase result is sent to the cloud manager. The cloud manager sends the response to the purchase result to the client according to the identifier of the client.

In one embodiment, the cipher chip may control switch-on and switch-off of a write circuit by using a level (e.g., voltage or current) of the write circuit. For example, a high level is set to switch on the write circuit, and a low level is set to switch off the write circuit; or a low level is set to switch on the write circuit, and a high level is set to switch off the write circuit. In another possible implementation, the cipher chip may control switch-on and switch-off of a write circuit by using a level change of the write circuit. For example, the write circuit is currently switched on. When it is detected that the level of the write circuit changes, the write circuit is switched off; or, when the write circuit is currently switched off, when it is detected that the level of the write circuit changes, the write circuit is switched on. The implementation of switch-on and switch-off of the write circuit is not limited in this embodiment.

It should be noted that when the USB key (electronic key) is connected to the first cloud encryptor, the first cloud encryptor writes the root key seed and the operating policy into the USB key. The USB key into which the root key and the operating policy are written is handed over to the user of the client in an offline manner.

Step 403: The client sends a second trigger request to the cloud manager.

The second trigger request is used to request the cloud manager to encrypt the database. In one embodiment, the second trigger request may be a database encryption request. In this case, the database encryption request is used to request the cloud manager to encrypt the database.

The database encryption request carries at least the identifier of the client and the identifier of the database that the user requests to encrypt.

Step 404: The cloud manager triggers, according to the second trigger request, the first cloud encryptor to store a data key seed and a data key identifier, and triggers a database proxy to store an encryption data dictionary.

For the definitions of the data key seed, the data key identifier, and the encryption data dictionary, see the descriptions in step 302 for details, which are not described herein again.

In this embodiment, the cloud manager obtains a data dictionary of the database through the database proxy under an indication of the second trigger request, and instructs the client to select a second encryption algorithm and an encryption granularity; the cloud manager sends the second encryption algorithm to the first cloud encryptor; the first cloud encryptor generates the data key identifier and the data key seed, and sends the data key identifier to the cloud manager, the data key seed carrying a flag bit used to indicate the second encryption algorithm; the cloud manager writes the data key identifier and the encryption granularity into the encryption data dictionary, and sends the encryption data dictionary to the database proxy; and the database proxy stores the encryption data dictionary.

The process in which the cloud manager obtains the data dictionary through the database proxy is: the cloud manager sends a data dictionary obtaining request to the database proxy, the data dictionary obtaining request carrying an identifier of a database; the database proxy determines the database according to the identifier of the database, and requests the database for the data dictionary; the database sends the data dictionary to the database proxy; and the database proxy forwards the data dictionary to the cloud manager.

When instructing the client to select the encryption granularity, the cloud manager performs login by using the identifier of the client carried in the second trigger request and displays an encryption granularity selection interface, and the user selects the encryption granularity from at least one encryption granularity displayed by the encryption granularity selection interface. Further, the user may further select a plurality of encryption granularities. For example, the user selects to encrypt a plurality of fields in a table. In this case, the plurality of fields corresponds to a group of data keys, or the user selects to encrypt fields in different tables, and in this case, the plurality of fields in each table corresponds to a group of data keys.

For each group of data keys, the cloud manager instructs the client to select the second encryption algorithm. The process in which the cloud manager instructs the client to select the second encryption algorithm is the same as the process in which the cloud manager instructs the client to the first encryption algorithm, Details are not described herein.

Because different data keys may be generated according to different second encryption algorithms, a user may update the data key by updating the second encryption algorithm, to dynamically update the key system according to user requirements.

After the cloud manager sends the second encryption algorithm to the first cloud encryptor, the first cloud encryptor generates the data key seed and the data key identifier through the cipher chip. The data key seed carries the flag bit used to indicate the second encryption algorithm. The data key identifier is used to identify the data key seed, and the generation process is not described in detail herein.

The first cloud encryptor further sends the data key seed to the cloud manager. The cloud manager writes the data key seed and the encryption granularity into the encryption data dictionary, and sends the encryption data dictionary to the database proxy for storage.

In some embodiments, the cloud manager sends the obtained data key identifier to the first cloud encryptor when the USB key is connected to the client; the first cloud encryptor determines the root key seed and the data key seed that correspond to the data key identifier, encrypts the data key seed by using a root key, and sends the data key identifier and an encrypted data key seed to the cloud manager, the root key being generated according to the root key seed; the cloud manager sends the data key identifier and the encrypted data key seed to the client; and the client writes the data key identifier and the encrypted data key seed into the USB key.

After the client receives the data key identifier and the encrypted data key seed, the user connects the USB key to the client, and writes the data key identifier and the encrypted data key seed into the USB key through the client.

In this embodiment, the USB key stores the root key seed, the operating policy, the data key identifier, and the encrypted data key seed. In this way, when the root key seed, the operating policy, the data key seed, and the data key identifier that are stored in the first cloud encryptor are destructed, the user may connect the USB key to the first cloud encryptor, and back up the root key seed, the operating policy, the data key seed, and the data key identifier to the first cloud encryptor through the USB key. The operating policy may generate the root key according to the root key seed, and then decrypt the encrypted data key seed according to the root key, to obtain the data key seed.

Step 405: The client sends a data processing request to the database proxy, when the data processing request is a read request, step 406 is executed, and when the data processing request is a write request, step 409 is executed.

Step 406: The database proxy reads first data from the database according to the read request, and when determining that the first data matches the encryption data dictionary, sends a decryption request carrying the first data and the data key identifier that is in the encryption data dictionary to the first cloud encryptor.

The database proxy determines that the first data read from the database matches the encryption data dictionary, and for the process of sending the decryption request carrying the first data and the data key identifier that is in the encryption data dictionary to the first cloud encryptor, see descriptions in step 304 for details, which are not described again herein.

It should be noted that, before sending the decryption request to the first cloud encryptor, the database proxy sends the CA certificate obtaining request to the first cloud encryptor; the first cloud encryptor sends the CA certificate to the database proxy; the database proxy establishes the CA secure channel with the first cloud encryptor by using the CA certificate, and the CA secure channel is used for data transmission between the database proxy and the first cloud encryptor.

After the CA secure channel is established, the database proxy sends, on the CA secure channel, a decryption request to the first cloud encryptor.

In some embodiments, the CA certificate in this embodiment has timeliness. When the CA certificate expires, the CA secure channel established based on the CA certificate also expires. The database proxy needs to obtain a new CA certificate from the first cloud encryptor again, and establishes a new CA secure channel with the first cloud encryptor by using the new CA certificate, to avoid a problem that when a fixed CA certificate is used, the CA secure channel is insecure when the CA certificate is compromised.

In this embodiment, the first data may be encrypted through the data key, and the operation cache area is encrypted through the root key. Data is transmitted through the CA secure channel, to form a three-layer encryption system, thereby improving the security of database encryption.

Step 407: The first cloud encryptor runs the operating policy, decrypts the first data by using the root key seed and the data key seed that correspond to the received data key identifier, and sends second data obtained after the decryption to the database proxy.

In this embodiment, the first cloud encryptor determines the operation cache area corresponding to the client through the operating policy, determines the root key seed corresponding to the received data key identifier, generates the root key according to the root key seed, encrypts the first data and the data key identifier according to the root key, and then caches the encrypted first data and the encrypted data key identifier into the operation cache area; in the operation cache area, the first cloud encryptor generates the data key according to the data key identifier, and decrypts the first data according to the data key, to obtain the third data; and reads the third data from the operation cache area, and decrypts the third data according to the root key, to obtain the second data.

The first cloud encryptor further encrypts, by using the root key in the operation cache area, program code for processing the first data. In this way, even if the encrypted program code is compromised, because the root key is secure, the encrypted program code cannot be decrypted, so that the process of processing the first data cannot be determined according to the program code, thereby ensuring the security of data processing.

The first cloud encryptor sends, on the CA secure channel, the second data to the database proxy.

Step 408: The database proxy sends the second data to client, and the flow ends.

Step 409: When determining that the first data in the write request matches the encryption data dictionary, the database proxy sends the encryption request carrying the first data and the data key identifier in the encryption data dictionary to the first cloud encryptor.

The database proxy determines that the first data in the write request matches the encryption data dictionary, and for the process of sending the encryption request carrying the first data and the data key identifier that is in the encryption data dictionary to the first cloud encryptor, see descriptions in step 304 for details, which are not described again herein.

It should be noted that, before sending the encryption request to the first cloud encryptor, the database proxy sends the CA certificate obtaining request to the first cloud encryptor; the first cloud encryptor sends the CA certificate to the database proxy; the database proxy establishes the CA secure channel with the first cloud encryptor by using the CA certificate, and the CA secure channel is used for data transmission between the database proxy and the first cloud encryptor. After the CA secure channel is established, the database proxy sends, on the CA secure channel, an encryption request to the first cloud encryptor.

In some embodiments, the CA certificate in this embodiment has timeliness. When the CA certificate expires, the CA secure channel established based on the CA certificate also expires. The database proxy needs to obtain a new CA certificate from the first cloud encryptor again, and establishes a new CA secure channel with the first cloud encryptor by using the new CA certificate, to avoid a problem that when a fixed CA certificate is used, the CA secure channel is insecure when the CA certificate is compromised.

Step 410: The first cloud encryptor runs the operating policy, encrypts the first data by using the root key seed and the data key seed that correspond to the received data key identifier, and sends second data obtained after the encryption to the database proxy.

In this embodiment, the first cloud encryptor determines the operation cache area corresponding to the client through the operating policy, the operation cache area being used for caching the intermediate data in the process in which the first cloud encryptor processes the first data; the first cloud encryptor determines the root key seed corresponding to the received data key identifier, generates the root key according to the root key seed, encrypts the first data and the data key identifier according to the root key, and then caches the encrypted first data and the encrypted data key identifier into the operation cache area; in the operation cache area, the first cloud encryptor generates the data key according to the data key identifier, and decrypts the first data according to the data key, to obtain the fourth data; and reads the fourth data from the operation cache area, and decrypts the fourth data according to the root key, to obtain the second data.

The first cloud encryptor further encrypts, by using the root key in the operation cache area, program code for processing the first data. In this way, even if the encrypted program code is compromised, because the root key is secure, the encrypted program code cannot be decrypted, so that the process of processing the first data cannot be determined according to the program code, thereby ensuring the security of data processing.

The first cloud encryptor sends, on the CA secure channel, the second data to the database proxy.

Step 411: The database proxy sends the second data to the database.

It should be noted that, the first cloud encryptor makes a delayed response to a detected behavior indicating illegitimate accessing the root key seed and the data key seed, according to an attack force of the detected behavior, or, destructs the root key seed and the data key seed that are stored in the first cloud encryptor according to the attack force of the detected behavior.

The cipher chip corresponding to the first cloud encryptor has a function of identifying a detected behavior. In one embodiment, the cipher chip switches off the write circuit after the initiation of the first cloud encryptor ends. When attempting to detect the first cloud encryptor, a hacker executes an illegitimate write behavior or export behavior through the write circuit. In this case, the cipher chip can identify the detected behavior according to the level change of the write circuit.

When determining, through the cipher chip, that the detected behavior exists, the first cloud encryptor makes a delayed response to the detected behavior according to the attack force of the detected behavior. For example, when the attack force is relatively weak, the first cloud encryptor makes a response to the detected behavior by a one-hour delay, and when the attack force is relatively strong, the first cloud encryptor makes a response to the detected behavior by a 1-day delay.

The hacker can continuously execute the detected behavior at a high frequency through the program. In this way, the hacker may crack the key system within short time. However, in this embodiment, the frequency of the detected behavior can be reduced by making a delayed response to the detected behavior, so that the hacker needs to spend long time in cracking the key system, and even some hackers are impatient to continue to crack the key system, and therefore abandon cracking the key system, and the security of the key system is improved. In addition, making a delayed response to the detected behavior may further reduce processing resources wasted by responding to the high-frequency detected behavior, and reduce the probability of breakdown of the first cloud encryptor due to shortage of processing resources.

The attack force may be determined according to parameters such as attack times and an attack frequency. For example, the number of attack times is in positive correlation with the strength of the attack force, and the attack frequency is in positive correlation with the strength of the attack force. This is not limited in this embodiment.

In some embodiments, the first cloud encryptor may further destruct the root key seed, the operating policy, the data key seed, and the data key identifier that are stored in the first cloud encryptor according to the attack force, to ensure the security of the key system.

It should be noted that, after the key system is updated, the original database may further be backed up in an offline manner, and the backed up database is updated by using a new key system, and the original database is replaced with the updated database, to implement an operation of combining the new database, so that the database is updated without affecting use of the original database. Replacing the backed up database refers to updating the data in the database using a new key system, and replacing the original data in the backed up database by using the updated data.

In this embodiment, the key system is generated by the cloud encryptor, is distributed by the cloud manage, and is stored by the USB key, so that the expandability of the key system is relatively good, and the key system is applicable to an environment with co-existence of a plurality of roles such as a cloud encryptor manufacturer, a cloud manager manufacturer, and a client. In addition, the USB key is independent of the cloud encryptor, and the USB key is also independent of the cloud manager. In this way, the USB key can separately store the key, and is separated from management of devices such as the cloud encryptor and the cloud manager, and the roles are defined.

Steps 401, 403 and 405 may be separately implemented as the embodiment on the client side, steps 402 and 404 may be separately implemented as the embodiment on the cloud manager side, steps 406, 408, 409, and 411 may be separately implemented as the embodiment on the database proxy side, and steps 407 and 410 may be separately implemented as the embodiment on the first cloud encryptor side.

Figure 5:
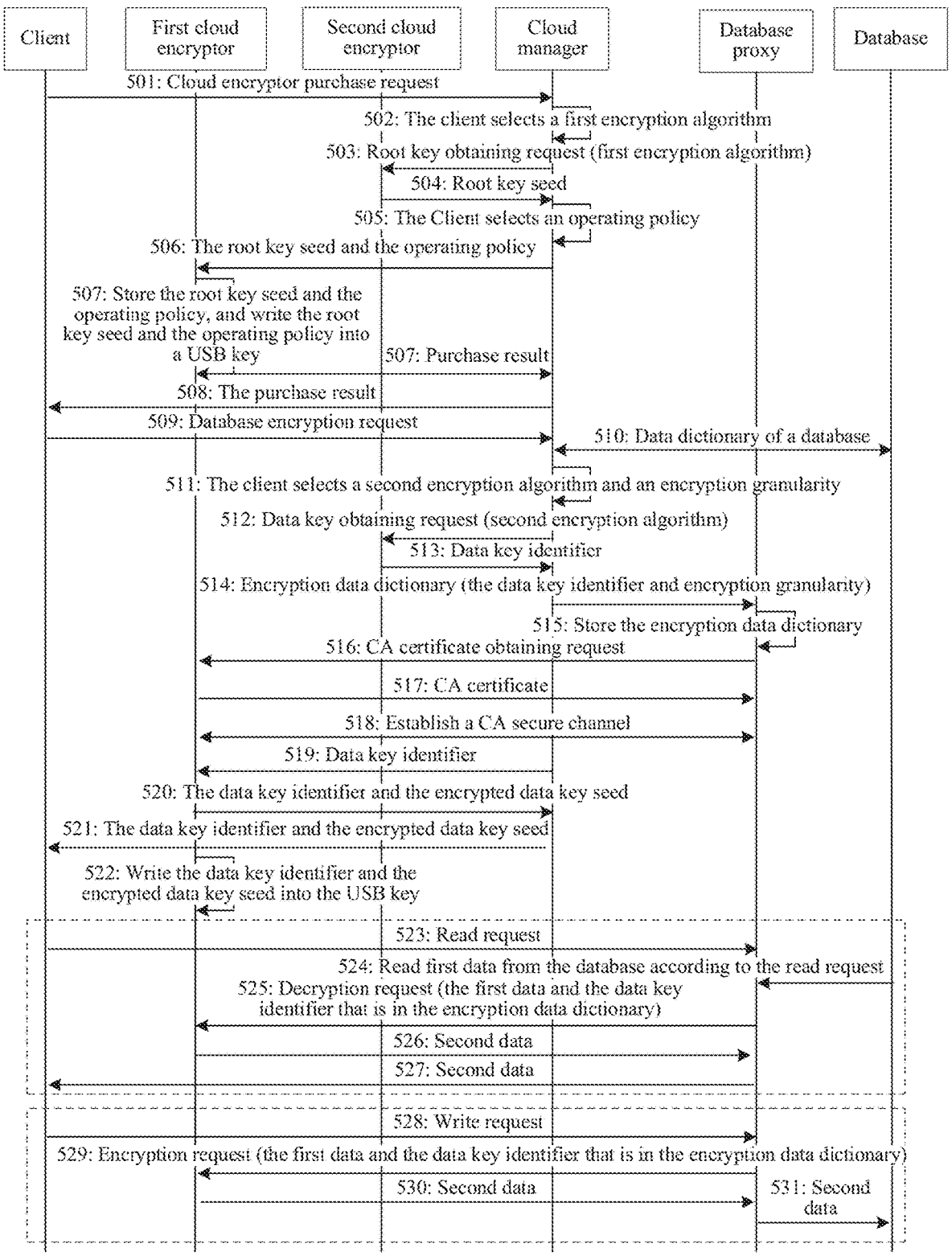
FIG. 5 is a schematic diagram of a data processing method according to another embodiment of this application.

The detailed process of the data processing method provided in this embodiment is described below. Refer to FIG. 5.

Step 501: A client sends a cloud encryptor purchase request to a cloud manager.

Step 502: The cloud manager instructs the client to select a first encryption algorithm.

Step 503: The cloud manager sends a root key obtaining request to a second cloud encryptor, the root key obtaining request carrying the first encryption algorithm.

Step 504: The second cloud encryptor sends a root key seed generated according to the first encryption algorithm to the cloud manager.

Step 505: The cloud manager instructs the client to select an operating policy.

Step 506: The cloud manager sends the root key seed and the operating policy to a first cloud encryptor.

Step 507: The first cloud encryptor stores the root key seed and the operating policy, writes the root key seed and the operating policy into a USB key, and sends a purchase result to the cloud manager.

The USB key is sent to a user of the client in an offline manner.

Step 508: The cloud manager sends the purchase result to the client.

Step 509: The client sends a database encryption request to the cloud manager.

Step 510: The cloud manager obtains a data dictionary of a database through a database proxy.

Step 511: The cloud manager instructs the client to select a second encryption algorithm and an encryption granularity.

Step 512: The cloud manager sends a data key seed obtaining request to the second cloud encryptor, the data key seed obtaining request carrying the second encryption algorithm.

Step 513: The second cloud encryptor generates the data key seed and generates the data key identifier according to the second encryption algorithm, and sends the data key identifier to the cloud manager.

Step 514: The cloud manager writes the encryption granularity and the data key identifier into the encryption data dictionary, and sends the encryption data dictionary to the database proxy.

Step 515: The database proxy stores the encryption data dictionary.

Step 516: The database proxy sends a CA certificate obtaining request to the first cloud encryptor.

Step 517: The first cloud encryptor sends a CA certificate to the database proxy.

Step 518: The database proxy establishes a CA secure channel according to the CA certificate and the first cloud encryptor.

Step 519: The cloud manager sends the data key identifier to the first cloud encryptor.

Step 520: The first cloud encryptor determines the root key seed and the data key seed according to the data key identifier, generates a root key according to the root key seed, encrypts the data key seed according to the root key, and sends the data key identifier and the encrypted data key seed to the cloud manager.

Step 521: The cloud manager sends the data key identifier and the encrypted data key seed to the client.

Step 522: The client writes the data key identifier and the encrypted data key seed into the USB key.

Step 523: The client sends a read request to the database proxy.

Step 524: The database proxy reads first data from the database according to the read request.

Step 525: The database proxy matches the first data with the encryption data dictionary, and when determining that the data needs to be decrypted, sends a decryption request to the second cloud encryptor through the CA secure channel, the decryption request carrying the first data and the data key identifier that is in the encryption data dictionary.

Step 526: The second cloud encryptor decrypts the data, and sends, through the CA secure channel, second data obtained after the decryption to the database proxy.

Step 527: The database proxy sends the second data to client, and the flow ends.

Step 528: The client sends a write request to the database proxy.

Step 529: The database proxy matches the first data in the write request with the encryption data dictionary, and when determining that the first data in the write request needs to be encrypted, sends an encryption request to the second cloud encryptor through the CA secure channel, the encryption request carrying the first data and the data key identifier that is in the encryption data dictionary.

Step 530: The second cloud encryptor encrypts the first data, and sends, through the CA secure channel, second data obtained after the encryption to the database proxy.

Step 531: The database proxy sends the second data to the database, and the flow ends.

Figure 6:
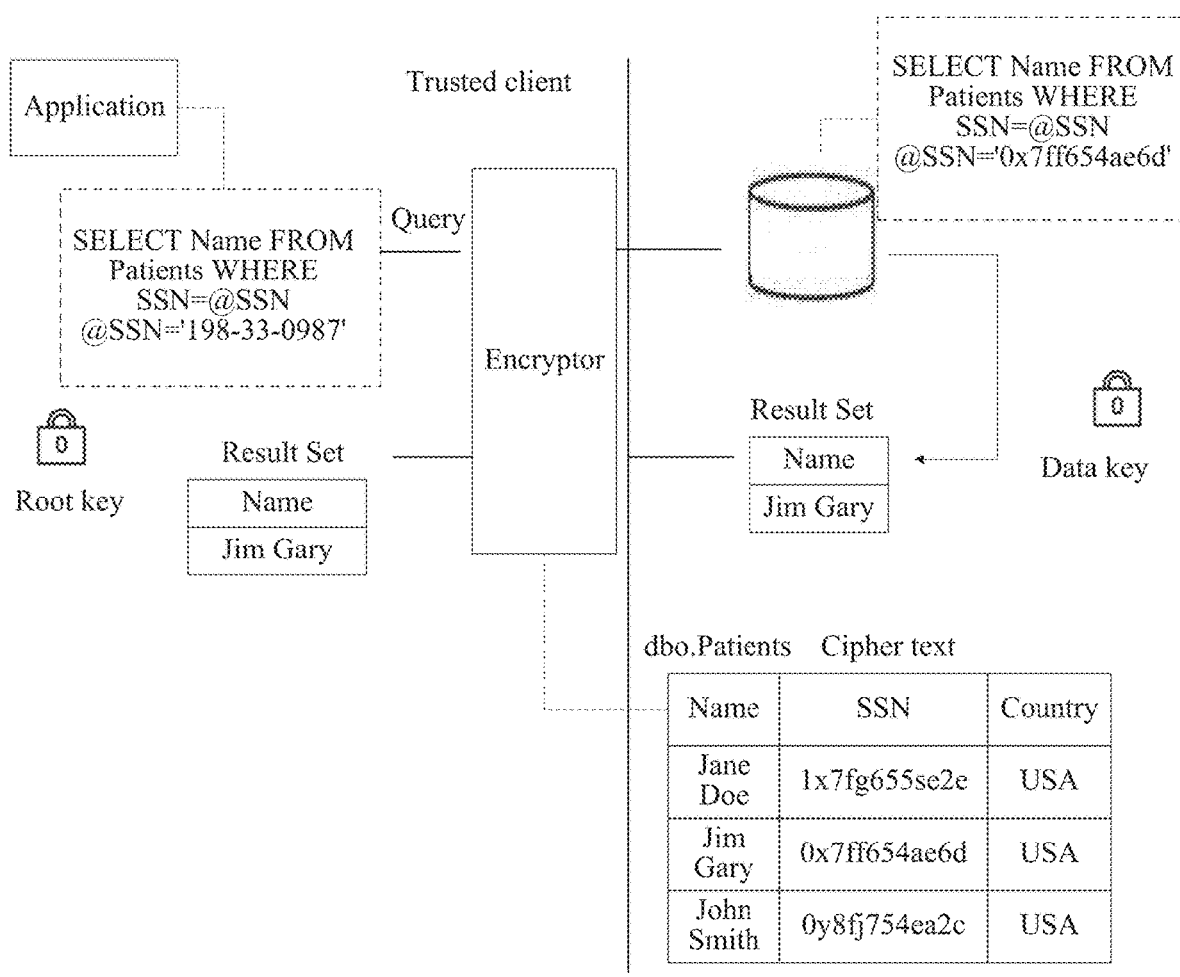
FIG. 6 is a schematic diagram of application of a data processing method according to another embodiment of this application.

Descriptions are provided below by using an example in which the data processing method provided in this embodiment is applied to a financial security database. Refer to FIG. 6. A trusted client needs to query data with a social security number (SSN) "198-33-0987" from the database proxy. The database proxy determines that cipher text of the SSN is "0x7ff654ae6d", decrypts a result set "Jim Gary" corresponding to the cipher text through a cloud encryptor, and feeds back the result set "Jim Gary" to the trusted client.

Based on the above, according to the data processing method provided in this embodiment of this application, when receiving the read request, the database proxy reads the first data from the database, and sends a decryption request carrying the first data and the data key identifier to the first cloud encryptor; the first cloud encryptor decrypts the first data by using the root key seed and the data key seed that correspond to the data key identifier; when receiving the write request, the database proxy sends an encryption request carrying the first data and the data key identifier to the first cloud encryptor; the first cloud encryptor encrypts the first data by using the root key seed and the data key seed that correspond to the data key identifier; because the root key, seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

The first cloud encryptor writes the root key seed and the operating policy into the USB key, and the client writes the data key identifier and the encrypted data key seed into the USB key, so that the user can separately store the root key seed, the operating policy, the data key identifier, and the data key seed. In this way, when the root key seed, the operating policy, the data key seed, and the data key identifier that are stored in the first cloud encryptor are destructed, the USB key backs up the root key seed, the operating policy, the data key seed, and the data key identifier to the first cloud encryptor, thereby improving the security of the key system.

Because the CA secure channel based on the CA certificate is established between the database proxy and the first cloud encryptor, the security of data transmitted between the database proxy and the first cloud encryptor can be ensured, to improve the security of the database. In addition, the CA certificate has timeliness, to avoid a problem that when a fixed CA certificate is used, the CA secure channel is insecure when the CA certificate is compromised.

When the first encryption algorithm selected by the client is updated, the corresponding root key is accordingly updated; and when the second encryption algorithm selected by the client is updated, the corresponding data key is accordingly updated, thereby dynamically updating the key system according to user requirements.

The client may select one of the database, the table, and the field as the encryption granularity according to requirements, thereby improving the flexibility of database encryption.

The first cloud encryptor makes a delayed response to a detected behavior indicating illegitimate accessing the root key seed and the data key seed, according to an attack force of the detected behavior, or, destructs the root key seed and the data key seed that are stored in the first cloud encryptor according to the attack force of the detected behavior.

Figure 7:
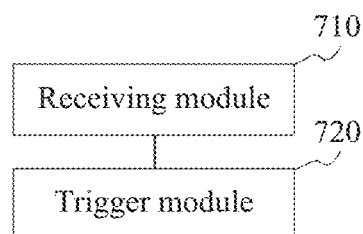
FIG. 7 is a structural block diagram of a data processing apparatus according to an embodiment of this application.

FIG. 7 is a structural block diagram of a data processing apparatus according to an embodiment of this application. The data processing apparatus may be applied to the cloud manager shown in FIG. 1. The data processing apparatus includes: a receiving module 710, configured to receive a trigger request sent by the client; a trigger module 720, configured to: trigger, according to the trigger request received by the receiving module 710, the first cloud encryptor to store a root key seed, an operating policy, a data key seed, and a data key identifier, and trigger the database proxy to store an encryption data dictionary, the operating policy indicating an operation policy of the first cloud encryptor. The first cloud encryptor is configured to: receive first data and the data key identifier in the encryption data dictionary that are sent by the database proxy, run the operating policy, process the first data by using the root key seed and the data key seed that correspond to the received data key identifier, and send second data obtained after the processing to the database proxy; the database proxy is configured to respond to the data processing request by using the second data, the first data being data that the data processing request requests to process, and the first data and the data key identifier being sent by the database proxy when the database proxy determines that the first data matches the encryption data dictionary.

In some embodiments, the data processing system further includes an electronic key USB key, and the apparatus further includes: a sending module, configured to send the obtained data key identifier to the first cloud encryptor when the USB key is connected to the client; the receiving module 710, further configured to receive the data key identifier and an encrypted data key seed that are sent by the first cloud encryptor, the encrypted data key seed being obtained as follows: the first cloud encryptor determines the root key seed and the data key seed that correspond to the data key identifier, generates a root key according to the root key seed, and encrypts the data key seed by using the root key; and the sending module, further configured to send the data key identifier and the encrypted data key seed to the client, the data key identifier and the encrypted data key seed being written into the USB key by the client.

In some embodiments, the trigger request includes a first trigger request and a second trigger request, and the trigger module 720 is further configured to: trigger, according to the first trigger request, the first cloud encryptor to store the root key seed and the operating policy; and trigger, according to the second trigger request, the first cloud encryptor to store the data key seed and the data key identifier, and trigger the database proxy to store the encryption data dictionary.

In some embodiments, the trigger module 720 is further configured to: instruct, under an indication of the first trigger request, the client to select a first encryption algorithm, and send the first encryption algorithm to the second cloud encryptor; receive the root key seed sent by the second cloud encryptor, the root key seed being generated by the second cloud encryptor, and the root key seed carrying a flag bit used for indicating the first encryption algorithm; and instruct the client to select the operating policy, and send the root key seed and the operating policy to the first cloud encryptor for storage.

In some embodiments, the trigger module 720 is further configured to: obtain a data dictionary of the database through the database proxy under an indication of the second trigger request, and instruct the client to select a second encryption algorithm and an encryption granularity, the encryption granularity being one of a database, a table, and a field; send the second encryption algorithm to the first cloud encryptor; receive the data key identifier sent by the first cloud encryptor, the data key identifier being sent after the first cloud encryptor generates the data key identifier and the data key seed, and the data key seed carrying a flag bit used for indicating the second encryption algorithm; and write the data key identifier and the encryption granularity into the encryption data dictionary, and send the encryption data dictionary to the database proxy for storage.

Based on the above, according to the data processing apparatus provided in this embodiment of this application, when receiving the data processing request and determining that the first data that the data processing request requests to process matches the encryption data dictionary, the database proxy sends the first data and the data key identifier to the first cloud encryptor; the first cloud encryptor processes the first data by using the root key seed and the data key seed that correspond to the received data key identifier; because the root key seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

The first cloud encryptor writes the root key seed and the operating policy into the USB key, and the client writes the data key identifier and the encrypted data key seed into the USB key, so that the user can separately store the root key seed, the operating policy, the data key identifier, and the data key seed. In this way, when the root key seed, the operating policy, the data key seed, and the data key identifier that are stored in the first cloud encryptor are destructed, the USB key backs up the root key seed, the operating policy, the data key seed, and the data key identifier to the first cloud encryptor, thereby improving the security of the key system.

Figure 8:
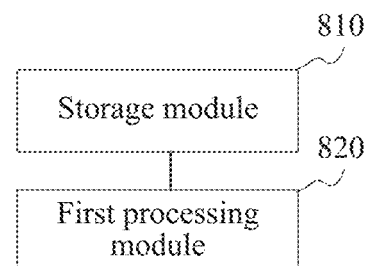
FIG. 8 is a structural block diagram of a data processing apparatus according to an embodiment of this application.

FIG. 8 is a structural block diagram of a data processing apparatus according to an embodiment of this application. The data processing apparatus may be applied to the first cloud encryptor shown in FIG. 1. The data processing apparatus includes: a storage module 810, configured to store a root key seed, an operating policy, a data key seed, and a data key identifier under trigger of the cloud manager, the trigger being generated after the cloud manage receives a trigger request sent by the client, and the operating policy indicating an operation policy of the first cloud encryptor; and a first processing module 820, configured to: receive first data and the data key identifier in the encryption data dictionary that are sent by the database proxy, run the operating policy, process the first data by using the root key seed and the data key seed that correspond to the received data key identifier, and send second data obtained after the processing to the database proxy, the database proxy being configured to respond to the data processing request by using the second data, the first data being data that the data processing request requests to process, and the first data and the data key identifier being sent by the database proxy when the database proxy determines that the first data matches the encryption data dictionary.

In some embodiments, the data processing system further includes an electronic key USB key, and the apparatus further includes: a writing module, configured to write the root key seed and the operating policy into the USB key when the USB key is connected to the first cloud encryptor; and a second processing module, configured to: receive the data key identifier sent by the cloud manager when the USB key is connected to the client; determine the root key seed and the data key seed that correspond to the data key identifier, encrypt the data key seed by using a root key, and send the data key identifier and an encrypted data key seed to the cloud manager, the root key being generated according to the root key seed, and the data key identifier and the encrypted data key seed being sent by the cloud manager to the client, and being mitten by the client into the USB key.

In some embodiments, the apparatus further includes: a first receiving module, configured to receive the root key seed, the operating policy, the data key seed, and the data key identifier that are sent by the USB key when the USB key is connected to the first cloud encryptor, and the root key seed, the operating policy, the data key seed, and the data key identifier that are stored in the first cloud encryptor are destructed.

In some embodiments, the apparatus further includes: a third processing module, configured to: make a delayed response to a detected behavior indicating illegitimate accessing the root key seed and the data key seed, according to an attack force of the detected behavior, or, destruct the root key seed, the operating policy, the data key seed, and the data key identifier that are stored in the first cloud encryptor according to the attack force of the detected behavior.

In some embodiments, the apparatus further includes: a second receiving module, configured to receive a CA certificate obtaining request sent by the database proxy; a sending module, configured to send the CA certificate to the database proxy; and an establishing module, configured to establish a CA secure channel with the database proxy by using the CA certificate, the CA secure channel being used for data transmission between the database proxy and the first cloud encryptor.

In some embodiments, the trigger request includes a first trigger request and a second trigger request, and the storage module 810 is further configured to: store the root key seed and the operating policy under trigger generated by the cloud manager according to the first trigger request; and store the root key seed and the operating policy under trigger generated by the cloud manager according to the second trigger request.

In some embodiments, the storage module 810 is further configured to: receive the root key seed and the operating policy that are sent by the cloud manager, the root key seed being generated by the second cloud encryptor after the cloud manager instructs, under an indication of the first trigger request, to send a first encryption algorithm selected by the client to the second cloud encryptor, the root key seed carrying a flag bit used for indicating the first encryption algorithm, and the operating policy being what the cloud manager instructs the client to select; and store the root key seed and the operating policy.

In some embodiments, the storage module 810 is further configured to: receive a second encryption algorithm sent by the cloud manager, the second encryption algorithm being what the cloud manager instructs the client to select after the cloud manager obtains, under an indication of the second trigger request, a data dictionary of the database through the database proxy; and generate the data key identifier and the data key seed, the data key seed carrying a flag bit used for indicating the second encryption algorithm, the cloud manager being further configured to: instruct the client to select an encryption granularity, write the data key identifier and the encryption granularity into the encryption data dictionary, and send the encryption data dictionary to the database proxy for storage, and the encryption granularity being one of a database, a table, and a field.

In some embodiments, when the data processing request is a read request, the first processing module 820 is further configured to: determine an operation cache area corresponding to the client through the operating policy, the operation cache area being used for caching intermediate data in a process in which the first cloud encryptor processes the first data; determine the root key seed corresponding to the data key identifier, generate a root key according to the root key seed, encrypt the first data and the data key identifier according to the root key, and then cache encrypted first data and an encrypted data key identifier into the operation cache area; in the operation cache area, generate a data key according to the data key identifier, and decrypt the first data according to the data key, to obtain third data; and read the data from the operation cache area, and decrypt the third data according to the root key, to obtain the second data.

In some embodiments, when the data processing request is a write request, the first processing module 820 is further configured to: determine an operation cache area corresponding to the client through the operating policy, the operation cache area being used for caching intermediate data in a process in which the first cloud encryptor processes the first data; determine the root key seed corresponding to the data key identifier, generate a root key according to the root key seed, encrypt the first data and the data key identifier according to the root key, and then cache encrypted first data and an encrypted data key identifier into the operation cache area; in the operation cache area, generate a data key according to the data key identifier, and encrypt the first data according to the data key, to obtain fourth data; and read the fourth data from the operation cache area, and decrypt the fourth data according to the root key, to obtain the second data.

Based on the above, according to the data processing apparatus provided in this embodiment of this application, when receiving the data processing request and determining that the first data that the data processing request requests to process matches the encryption data dictionary, the database proxy sends the first data and the data key identifier to the first cloud encryptor; the first cloud encryptor processes the first data by using the root key seed and the data key seed that correspond to the received data key identifier; because the root key seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

The first cloud encryptor writes the root key seed and the operating policy into the USB key, and the client writes the data key identifier and the encrypted data key seed into the USB key, so that the user can separately store the root key seed, the operating policy, the data key identifier, and the data key seed. In this way, when the root key seed, the operating policy, the data key seed, and the data key identifier that are stored in the first cloud encryptor are destructed, the USB key backs up the root key seed, the operating policy, the data key seed, and the data key identifier to the first cloud encryptor, thereby improving the security of the key system.

Because the CA secure channel based on the CA certificate is established between the database proxy and the first cloud encryptor, the security of data transmitted between the database proxy and the first cloud encryptor can be ensured, to improve the security of the database. In addition, the CA certificate has timeliness, to avoid a problem that a fixed CA certificate is used, the CA secure channel is insecure when the CA certificate is compromised.

The first cloud encryptor makes a delayed response to a detected behavior indicating illegitimate accessing the root key seed and the data key seed, according to an attack force of the detected behavior, or, destructs the root key seed and the data key seed that are stored in the first cloud encryptor according to the attack force of the detected behavior.

Figure 9:
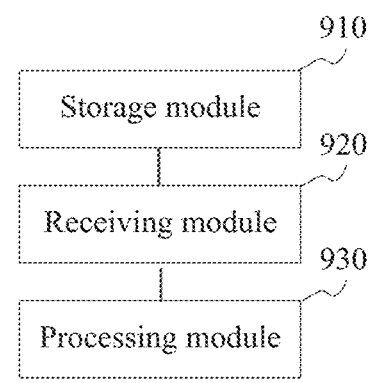
FIG. 9 is a structural block diagram of a data processing apparatus according to an embodiment of this application.

FIG. 9 is a structural block diagram of a data processing apparatus according to an embodiment of this application. The data processing apparatus may be applied to the database proxy shown in FIG. 1, The data processing apparatus includes: a storage module 910, configured to store an encryption data dictionary under trigger of the cloud manager, the trigger being generated after the cloud manage receives a trigger request sent by the client, the cloud manager being further configured to trigger the first cloud encryptor to store a root key seed, an operating policy, a data key seed, and a data key identifier, and the operating policy indicating an operation policy of the first cloud encryptor.

The apparatus further includes: a receiving module 920, configured to receive a data processing request sent by the client; and a processing module 930, configured to: send first data that the data processing request requests to process and the data key identifier in the encryption data dictionary to the first cloud encryptor when determining that the first data matches the encryption data dictionary; receive second data sent by the first cloud encryptor after the first cloud encryptor runs the operating policy and processes the first data by using the root key seed and the data key seed that correspond to the received data key identifier; and respond to the data processing request by using the second data.

In some embodiments, the apparatus further includes: a sending module, configured to send a CA certificate obtaining request to the first cloud encryptor; the receiving module 920, further configured to receive the CA certificate sent by the first cloud encryptor; and an establishing module, configured to establish a CA secure channel with the first cloud encryptor by using the CA certificate received by the receiving module 920, the CA secure channel being used for data transmission between the database proxy and the first cloud encryptor.

In some embodiments, the trigger request includes a second trigger request, and the storage module 910 is further configured to: receive the encryption data dictionary sent by the cloud manager, the data key identifier and an encryption granularity being written the encryption data dictionary, the data key identifier being generated by the first cloud encryptor after the cloud manager obtains, under an indication of the second trigger request, a data dictionary of the database through the database proxy, instructs the client to select a second encryption algorithm and the encryption granularity, and send the second encryption algorithm to the first cloud encryptor, and the encryption granularity being one of a database, a table, and a field; and store the encryption data dictionary.

Based on the above, according to the data processing apparatus provided in this embodiment of this application, when receiving the data processing request and determining that the first data that the data processing request requests to process matches the encryption data dictionary, the database proxy sends the first data and the data key identifier to the first cloud encryptor; the first cloud encryptor processes the first data by using the root key seed and the data key seed that correspond to the received data key identifier; because the root key seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

Because the CA secure channel based on the CA certificate is established between the database proxy and the first cloud encryptor, the security of data transmitted between the database proxy and the first cloud encryptor can be ensured, to improve the security of the database. In addition, the CA certificate has timeliness, to avoid a problem that a fixed CA certificate is used, the CA secure channel is insecure when the CA certificate is compromised.

Figure 10:
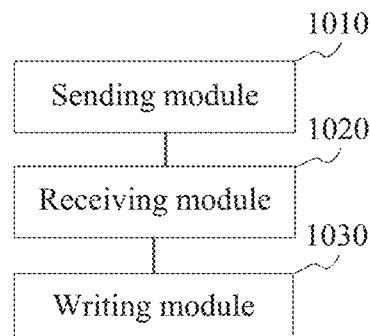
FIG. 10 is a structural block diagram of a data processing apparatus according to an embodiment of this application.

FIG. 10 is a structural block diagram of a data processing apparatus according to an embodiment of this application. The data processing apparatus may be applied to the client shown in FIG. 1. The data processing apparatus includes: a sending module 1010, configured to send a trigger request to the cloud manager, the trigger request being used for instructing the cloud manager to trigger the first cloud encryptor to store a root key seed, an operating policy, a data key seed, and a data key identifier, and trigger the database proxy to store an encryption data dictionary, and the operating policy indicating an operation policy of the first cloud encryptor; and the sending module 1010, further configured to send a data processing request to the database proxy, the database proxy being configured to send first data that the data processing request requests to process and the data key identifier in the encryption data dictionary to the first cloud encryptor when determining that the first data matches the encryption data dictionary, the first cloud encryptor being configured to: run the operating policy, process the first data by using the root key seed and the data key seed that correspond to the received data key identifier, and send second data obtained after the processing to the database proxy, and the database proxy being configured to respond to the data processing request by using the second data.

In some embodiments, the data processing system further includes an electronic key. USB key, and the apparatus further includes: a receiving module 1020, configured to: receive the data key identifier and an encrypted data key seed that are sent by the cloud manager when the USB key is connected to the client, the obtained data key identifier being sent by the cloud manager to the first cloud encryptor, the root key seed and the data key seed that correspond to the data key identifier being determined by the first cloud encryptor, the data key seed being encrypted by using a root key, and then the encrypted data key seed being sent to the cloud manager, and the root key being generated according to the root key seed; and a writing module 1030, configured to write the data key identifier and the encrypted data key seed into the USB key.

In some embodiments, the trigger request includes a first trigger request and a second trigger request, and the sending module 1010 is further configured to: send the first trigger request to the cloud manager, the first trigger request being used for instructing the cloud manager to trigger the first cloud encryptor to store the root key seed and the operating policy; and send the second trigger request to the cloud manager, the second trigger request being used for instructing the cloud manager to trigger the first cloud encryptor to store the data key seed and the data key identifier, and trigger the database proxy to store the encryption data dictionary.

Based on the above, according to the data processing apparatus provided in this embodiment of this application, when receiving the data processing request and determining that the first data that the data processing request requests to process matches the encryption data dictionary, the database proxy sends the first data and the data key identifier to the first cloud encryptor; the first cloud encryptor processes the first data by using the root key seed and the data key seed that correspond to the received data key identifier; because the root key seed and the data key seed are stored in the first cloud encryptor, the first data is stored in the database, that is, the key system is separated from the database; in this way, even if the first data in the database is compromised, if the root key seed and the data key seed in the first cloud encryptor is secure, the first data still cannot be identified, thereby improving the security of the database.

The first cloud encryptor writes the root key seed and the operating policy into the USB key, and the client writes the data key identifier and the encrypted data key seed into the USB key, so that the user can separately store the root key seed, the operating policy, the data key identifier, and the data key seed. In this way, when the root key seed, the operating policy, the data key seed, and the data key identifier that are stored in the first cloud encryptor are destructed, the USB key backs up the root key seed, the operating policy, the data key seed, and the data key identifier to the first cloud encryptor, thereby improving the security of the key system.

When the first encryption algorithm selected by the client is updated, the corresponding root key is accordingly updated; and when the second encryption algorithm selected by the client is updated, the corresponding data key is accordingly updated, thereby dynamically updating the key system according to user requirements.

The client may select one of the database, the table, and the field as the encryption granularity according to requirements, thereby improving the flexibility of database encryption.

Referring to FIG. 1, an embodiment of this application provides a data processing system. The data processing system includes a client 110, a first cloud encryptor 120, a cloud manager 130, a second cloud encryptor 140, a database proxy 150, and a database 160.

The client 110 is the client including the data processing apparatus shown in FIG. 10. The first cloud encryptor 120 is the first cloud encryptor including the data processing apparatus shown in FIG. 8. The cloud manager 130 is the cloud manager including the data processing apparatus shown in FIG. 7, The database proxy 150 is the database proxy including the data processing apparatus shown in FIG. 9.

Figure 11:
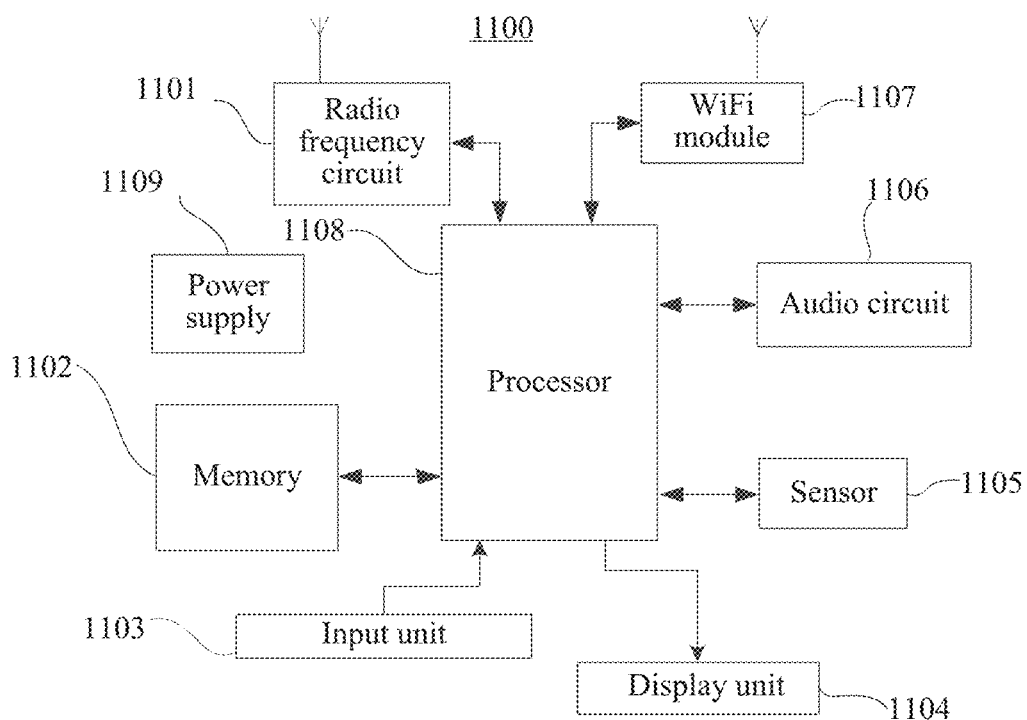
FIG. 11 is a structural block diagram of a terminal according to still another embodiment of this application.

FIG. 11 is a block diagram of a terminal 1100 according to an embodiment of this application. The client or the first cloud encryptor or the cloud manager or the second cloud encryptor or the database proxy or the database shown in FIG. 1 may be installed in the terminal 1100.

The terminal include components such as a radio frequency (RE) circuit 1101, a memory 1102 including one or more computer readable storage media, an input unit 1103, a display unit 1104, a sensor 1105, an audio circuit 1106, a wireless fidelity (Wi-Fi) module 1107, a processor 1108 including one or more processing cores, and a power supply 1109. A person skilled in the art may understand that the structure of the terminal shown in FIG. 11 does not constitute a limitation to the terminal, and the terminal may include more components or fewer components than those shown in the figure, or some components may be combined, or a different component deployment may be used.

The RE circuit 1101 may be configured to receive and send signals during an information receiving and sending process or a call process. Particularly, the RF circuit receives downlink information from a base station, then delivers the downlink information to one or more processors 1108 for processing, and sends related uplink data to the base station. Generally, the RE circuit 1101 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1101 may also communicate with a network and another device by wireless communication. The wireless communication may use any communications standard or protocol, which includes but is not limited to, Global System for Mobile Communications (GSM), General Packet Radio Service (CPRS), Code Division Multiple Access (CDMA), Wideband Code Division Multiple Access (WCDMA), Long Term Evolution (LTE), e-mail, Short Message Service (SMS), and the like. The memory 1102 may be configured to store a software program and module. The processor 1108 runs the software program and module stored in the memory 1102, to implement various functional applications and data processing. The memory 1102 may mainly include a program storage area and a data storage area. The program storage area may store an operating system, an application program required by at least one function (such as a sound playback function and an image display function), and the like. The data storage area may store data (such as audio data and an address book) created according to use of the terminal device, and the like. In addition, the memory 1102 may include a high speed random access memory, and may further include a non-volatile memory, such as at least one magnetic disk storage device, a flash memory, or other volatile solid-state storage devices. Correspondingly, the memory 1102 may further include a memory controller, to provide access of the processor 1108 and the input unit 1103 to the memory 1102.

The input unit 1103 may be configured to receive input digit or character information, and generate a keyboard, mouse, joystick, optical, or track ball signal input related to the user setting and function control. In an exemplified embodiment, the input unit 1103 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1108. Moreover, the touch contoller can receive and execute a command sent from the processor 1108. In addition, the touch-sensitive surface may be implemented in multiple types, such as a resistive type, a capacitive type, an infrared type, and a surface acoustic wave type. In addition to the touch-sensitive surface, the input unit 1103 may further include another input device. The another input device may include but is not limited to one or more of a physical keyboard, a function key (for example, a volume control key or a power on/off key), a trackball, a mouse, or a joystick.

The display unit 1104 may be configured to display information input by the user or information provided for the user, and various graphical user interfaces of the terminal device. These graphical user interfaces may include a graph, text, an icon, a video and any combination thereof. The display unit 1104 may include a display panel. In some embodiments, the display panel may be configured in a form of a liquid crystal display (LCD), an organic light-emitting diode (OLED), or the like. The touch-sensitive surface may cover the display panel. After detecting a touch operation on or near the touch-sensitive surface, the touch-sensitive surface transfers the touch operation to the processor 1108, so as to determine the type of the touch event. Then, the processor 1108 provides a corresponding visual output on the display panel according to the type of the touch event. Although, in FIG. 11, the touch-sensitive surface and the display panel are used as two separate parts to implement input and output functions, in some embodiments, the touch-sensitive surface and the display panel may be integrated to implement the input and output functions.

The terminal may further include at least one sensor 1105 such as an optical sensor, a motion sensor, and other sensors. The optical sensor may include an ambient light sensor and a proximity sensor, where the ambient light sensor may adjust luminance of the display panel according to the luminance of the ambient light, and the proximity sensor may switch off the display panel and/or backlight when the terminal is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal is not described herein again.

The audio circuit 1106, a loudspeaker, and a microphone may provide audio interfaces between the user and the terminal. The audio circuit 1106 may convert received audio data into an electric signal and transmit the electric signal to the loudspeaker. The loudspeaker converts the electric signal into a sound signal for output. On the other hand, the microphone converts a collected sound signal into an electric signal. The audio circuit 1106 receives the electric signal and converts the electric signal into audio data, and outputs the audio data to the processor 1108 for processing. Then, the processor 1108 sends the audio data to, for example, another terminal by using the RF circuit 1101, or outputs the audio data to the memory 1102 for further processing. The audio circuit 1106 may further include an earplug jack, to provide communication between a peripheral earphone and the terminal.

Wi-Fi belongs to a short distance wireless transmission technology. The terminal may help, by using the Wi-Fi module 1107, a user to receive and send an email, browse a web page, access stream media, and the like. This provides wireless broadband Internet access for the user. Although FIG. 11 shows the module 1107, it may be understood that the Wi-Fi module 1107 is not a necessary component of the terminal, and the Wi-Fi module may be omitted as required provided that the scope of the essence of the application is not changed.

The processor 1108 is the control center of the terminal, and is connected to various parts of the mobile phone by using various interfaces and lines. By running or executing the software program and/or module stored in the memory 1102, and invoking data stored in the memory 1102, the processor 1108 performs various functions of the modules and data processing of the terminal, thereby performing overall monitoring on the mobile phone. In some embodiments, the processor 1108 may include one or more processing cores. Preferably, the processor 1108 may integrate an application processor and a modem processor. The application processor mainly processes an operating system, a user interface, an application program, and the like. The modem processor mainly processes wireless communication. It may be understood that the foregoing modem may not be integrated into the processor 1108, either.

The mobile phone further includes the power supply 1109 (such as a battery) for supplying power to the components. Preferably, the power supply may be logically connected to the processor 1108 by using a power management system, thereby implementing functions such as charging, discharging and power consumption management by using the power management system. The power supply 1109 may further include one or more of a direct current or alternating current power supply, a re-charging system, a power failure detection circuit, a power supply converter or inverter, a power supply state indicator, and any other component.

Although not shown in the figure, the terminal may further include a camera, a Bluetooth module, and the like, which are not further described herein. In this embodiment, the processor 1108 in the terminal runs one or more program instructions stored in the memory 1102, so as to implement data processing methods according to the foregoing various method embodiments.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

An embodiment of the present disclosure provides a computer readable storage medium, the storage medium storing at least one instruction, at least one program, and a code set or an instruction set, and the at least one instruction, the at least one program, and the code set or the instruction set being loaded and executed by the processor to implement the data processing method described above.

It should be noted that, when the data processing apparatus provided in the foregoing embodiment processes data, only an example of division of the foregoing functional modules is described, and in actual application, the foregoing functions may be implemented by different functional modules as required, that is, the internal structure of the data processing apparatus is divided into different functional modules, to implement all or some of the functions described above. A functional module, in some embodiments, may include one or more computer programs stored in computer readable medium. When executed by one or more processors, the computer programs perform the functions corresponding to the functional module. In addition, the data processing apparatus provided in the foregoing embodiment belongs to the same concept as the embodiment of the service processing method. For a specific implementation process of the data processing apparatus, refer to the method embodiment, and details are not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are not intended to limit this application. Any modification, equivalent replacement, improvement and the like made within the spirit and principle of this application should fall within the protection scope of this application.

What is claimed is:

1. A data processing method, applied to a data processing system comprising, a first cloud encryptor, a cloud manager, a database proxy, and a database, the first cloud encryptor being a cloud encryptor allocated by the cloud manager to a client, and the method comprising:
   receiving, by the cloud manager, a trigger request from the client;
   triggering, by the cloud manager according to the trigger request, the first cloud encryptor to store a root key seed, an operating policy, a data key seed, and a data key identifier, and triggering, by the cloud manager, the database proxy to store an encryption data dictionary, the operating policy indicating an operation policy of the first cloud encryptor;
   receiving, by the database proxy, a data processing request from the client;
   sending, by the database proxy, first data that the data processing request requests to process and the data key identifier in the encryption data dictionary to the first cloud encryptor in response to determining that the first data matches the encryption data dictionary;

implementing, by the first cloud encryptor, the operating policy, processing the first data by using the root key seed and the data key seed that correspond to the data key identifier, and sending second data obtained after the processing to the database proxy;

responding, by the database proxy, to the data processing request by using the second data; and making, by the first cloud encryptor, a delayed response to a detected behavior indicating illegitimate accessing the root key seed and the data key seed, according to an attack force of the detected behavior, or, destructing the root key seed, the operating policy, the data key seed, and the data key identifier that are stored in the first cloud encryptor according to the attack force of the detected behavior.

2. The method according to claim 1, wherein the data processing system further comprises an electronic key USB key, and the method further comprises:

writing, by the first cloud encryptor, the root key seed and the operating policy into the USB key when the USB key is connected to the first cloud encryptor;

sending, by the cloud manager, the data key identifier to the first cloud encryptor when the USB key is connected to the client;

determining, by the first cloud encryptor, the root key seed and the data key seed corresponding to the data key identifier, encrypting the data key seed by using a root key, and sending the data key identifier and an encrypted data key seed to the cloud manager, the root key being generated according to the root key seed;

sending, by the cloud manager, the data key identifier and the encrypted data key seed to the client;

receiving, by the first cloud encryptor, the data key identifier and the encrypted data key seed written into the USB key by the client; and retrieving, by the first cloud encryptor, the root key seed, the operating policy, the data key seed, and the data key in the USB key, when the USB key is connected to the first cloud encryptor, and the root key seed, the operating policy, the data key seed, and the data key identifier that are stored in the first cloud encryptor are destructed.

3. The method according to claim 1, wherein the method further comprises:

sending, by the database proxy, a certificate authority (CA) certificate obtaining request to the first cloud encryptor;

sending, by the first cloud encryptor, the CA certificate to the database proxy; and establishing, by the database proxy, a CA secure channel with the first cloud encryptor by using the CA certificate, the CA secure channel being used for data transmission between the database proxy and the first cloud encryptor.

4. The method according to claim 1, wherein the method further comprises:

receiving, by the cloud manager, a first trigger request from the client;

triggering, by the cloud manager according to the first trigger request, the first cloud encryptor to store the root key seed and the operating policy;

receiving, by the cloud manager, a second trigger request from the client; and triggering, by the cloud manager according to the second trigger request, the first cloud encryptor to store the data key seed and the data key identifier, and triggering the database proxy to store the encryption data dictionary.

5. The method according to claim 4, wherein the method further comprises:

instructing, by the cloud manager under an indication of the first trigger request, the client to select a first encryption algorithm, and send the first encryption algorithm to a second cloud encryptor;

generating, by the second cloud encryptor, the root key seed, and sending the root key seed to the cloud manager, the root key seed carrying a flag bit used for indicating the first encryption algorithm;

receiving, by the cloud manager, the root key seed sent by the second cloud encryptor;

instructing, by the cloud manager, the client to select the operating policy, and send the root key seed and the operating policy to the first cloud encryptor; and storing, by the first cloud encryptor, the root key seed and the operating policy.

6. The method according to claim 4, wherein the method further comprises:

obtaining, by the cloud manager, a data dictionary of the database through the database proxy under an indication of the second trigger request, and instructing the client to select a second encryption algorithm and an encryption granularity, the encryption granularity being one of a database, a table, and a field;

sending, by the cloud manager, the second encryption algorithm to the first cloud encryptor;

generating, by the first cloud encryptor, the data key identifier and the data key seed, and sending the data key identifier to the cloud manager, the data key seed carrying a flag bit used for indicating the second encryption algorithm;

writing, by the cloud manager, the data key identifier and the encryption granularity into the encryption data dictionary, and sending the decryption data dictionary to the database proxy; and storing, by the database proxy, the encryption data dictionary.

7. The method according to claim 1, wherein the method further comprises:

determining, by the first cloud encryptor, an operation cache area corresponding to the client through the operating policy, the operation cache area being used for caching intermediate data in a process in which the first cloud encryptor processes the first data;

determining, by the first cloud encryptor, the root key seed corresponding to the received data key identifier, generating a root key according to the root key seed, encrypting the first data and the data key identifier according to the root key, and then caching encrypted first data and an encrypted data key identifier into the operation cache area;

in the operation cache area, generating, by the first cloud encryptor, a data key according to the data key identifier, and decrypting the first data according to the data key, to obtain third data;

retrieving, by the first cloud encryptor, the third data from the operation cache area, and decrypting the third data according to the root key, to obtain the second data;

determining, by the first cloud encryptor, an operation cache area corresponding to the client through the operating policy, the operation cache area being used for caching intermediate data in a process in which the first cloud encryptor processes the first data;

determining, by the first cloud encryptor, the root key seed corresponding to the data key identifier, generating a root key according to the root key seed, encrypting the first data and the data key identifier according to the root key, and then caching encrypted first data and an encrypted data key identifier into the operation cache area;

in the operation cache area, generating, by the first cloud encryptor, a data key according to the data key identifier, and encrypting the first data according to the data key, to obtain fourth data; and retrieving, by the first cloud encryptor, the fourth data from the operation cache area, and decrypting the fourth data according to the root key, to obtain the second data.

8. A data processing system, the data processing system comprising a first cloud encryptor, a cloud manager, a database proxy, a database, and a USB key, the first cloud encryptor being a cloud encryptor allocated by the cloud manager to a client, wherein:

the cloud manager receives a trigger request from the client; the cloud manager triggers, according to the trigger request, the first cloud encryptor to store a root key seed, an operating policy, a data key seed, and a data key identifier, and trigger the database proxy to store an encryption data dictionary, the operating policy indicating an operation policy of the first cloud encryptor;

the database proxy receives a data processing request from the client;

the database proxy sends first data that the data processing request requests to process and the data key identifier in the encryption data dictionary to the first cloud encryptor when determining that the first data matches the encryption data dictionary;

the first cloud encryptor implements the operating policy, processes the first data by using the root key seed and the data key seed that correspond to the data key identifier, and send second data obtained after the processing to the database proxy;

the database proxy responds to the data processing request by using the second data;

the first cloud encryptor makes a delayed response to a detected behavior indicating illegitimate accessing the root key seed and the data key seed, according to an attack force of the detected behavior, or, destructs the root key seed, the operating policy, the data key seed, and the data key identifier that are stored in the first cloud encryptor according to the attack force of the detected behavior; and when the USB key is connected to the first cloud encryptor the first cloud encryptor writes the root key seed and the operating policy into the USB key; and when the USB key is connected to the client, the cloud manager sends the data key identifier to the first cloud encryptor.

9. The data processing system according to claim 8, wherein:

the first cloud encryptor further determines the root key seed and the data key seed that correspond to the data key identifier, encrypts the data key seed by using a root key, and sends the data key identifier and an encrypted data key seed to the cloud manager, the root key being generated according to the root key seed;

the cloud manager is further configured to send the data key identifier and the encrypted data key seed to the client; and the client is further configured to write the data key identifier and the encrypted data key seed into the USB key.

10. The data processing system according to claim 8, wherein the database proxy sends a certificate authority (CA) certificate obtaining request to the first cloud encryptor;

the first cloud encryptor sends the CA certificate to the database proxy; and the database proxy establishes a CA secure channel with the first cloud encryptor by using the CA certificate, the CA secure channel being used for data transmission between the database proxy and the first cloud encryptor.

11. The data processing system according to claim 8, wherein:

the cloud manager receives a first trigger request from the client;

the cloud manager triggers, according to the first trigger request, the first cloud encryptor to store the root key seed and the operating policy;

the cloud manager receives a second trigger request from the client; and the cloud manager further triggers, according to the second trigger request, the first cloud encryptor to store the data key seed and the data key identifier, and triggers the database proxy to store the encryption data dictionary.

12. The data processing system according to claim 8, wherein the data processing system further comprises a second cloud encryptor, and the cloud manager instructs, under an indication of the first trigger request, the client to select a first encryption algorithm, and send the first encryption algorithm to the second cloud encryptor;

the second cloud encryptor generates the root key seed, and send the root key seed to the cloud manager, the root key seed carrying a flag bit used for indicating the first encryption algorithm; the cloud manager receives the root key seed sent by the second cloud encryptor;

the cloud manager instructs the client to select the operating policy, and sends the root key seed and the working program to the first cloud encryptor; and the first cloud encryptor stores the root key seed and the operating policy.

13. The data processing system according to claim 8, wherein the cloud manager obtains a data dictionary of the database through the database proxy under an indication of the second trigger request, and instructs the client to select a second encryption algorithm and an encryption granularity, the encryption granularity being one of a database, a table, and a field;

the cloud manager sends the second encryption algorithm to the first cloud encryptor;

the first cloud encryptor generates the data key identifier and the data key seed, and sends the data key identifier to the cloud manager, the data key seed carrying a flag bit used for indicating the second encryption algorithm; the cloud manager writes the data key identifier and the encryption granularity into the encryption data dictionary, and sends the decryption data dictionary to the database proxy; and the database proxy stores the encryption data dictionary.

14. The data processing system according to claim 8, wherein
when the data processing system receives a read request, the first cloud encryptor further: determines an operation cache area corresponding to the client through the operating policy, the operation cache area being used for caching intermediate data in a process in which the first cloud encryptor processes the first data;
determines the root key seed corresponding to the data key identifier, generate a root key according to the root key seed, encrypt the first data and the data key identifier according to the root key, and then cache encrypted first data and an encrypted data key identifier into the operation cache area;
in the operation cache area, generates a data key according to the data key identifier, and decrypts the first data according to the data key, to obtain third data; and
retrieves the third data from the operation cache area, and decrypts the third data according to the root key, to obtain the second data.

15. The data processing system according to claim 8, wherein when the data processing system receives a write request, the first cloud encryptor further:
determines an operation cache area corresponding to the client through the operating policy, the operation cache area being used for caching intermediate data in a process in which the first cloud encryptor processes the first data;
determines the root key seed corresponding to the data key identifier, generates a root key according to the root key seed, encrypts the first data and the data key identifier according to the root key, and then cache encrypted first data and an encrypted data key identifier into the operation cache area;
in the operation cache area, generates a data key according to the data key identifier, and encrypts the first data according to the data key, to obtain fourth data; and
retrieves the fourth data from the operation cache area, and decrypts the fourth data according to the root key, to obtain the second data.

* * * * *